W. O. WILLE.
TOOL HOLDER.
APPLICATION FILED APR. 8, 1920.

1,387,672.

Patented Aug. 16, 1921.

Inventor,
Walter O. Wille, by
G. C. Kennedy
Attorney.

UNITED STATES PATENT OFFICE.

WALTER O. WILLE, OF WATERLOO, IOWA.

TOOL-HOLDER.

1,387,672.　　　Specification of Letters Patent.　　Patented Aug. 16, 1921.

Application filed April 8, 1920. Serial No. 372,181.

*To all whom it may concern:*

Be it known that I, WALTER O. WILLE, a citizen of the United States of America, and a resident of Waterloo, Blackhawk county, Iowa, have invented certain new and useful Improvements in Tool-Holders, of which the following is a specification.

The present invention appertains to a tool holder for use on lathes, planers, shapers and the like, and aims to provide a novel and improved device of that character.

It is the object of the present invention to provide a tool holder adapted to be held by the ordinary tool post, and designed to hold a cutter or bit, novel means being provided for clamping or locking the cutter or bit in any adjusted position.

With the foregoing object outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
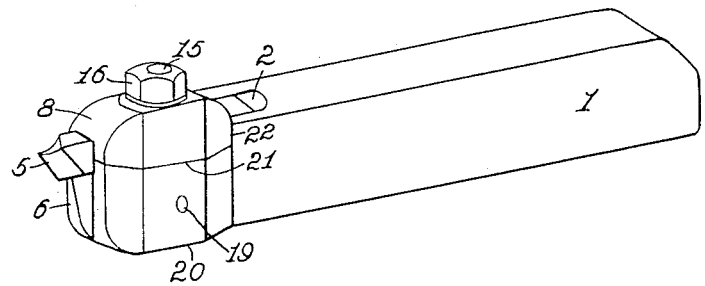
Figure 2:
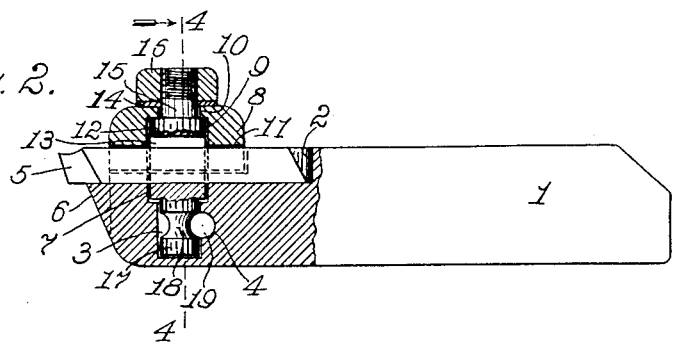
Figure 3:
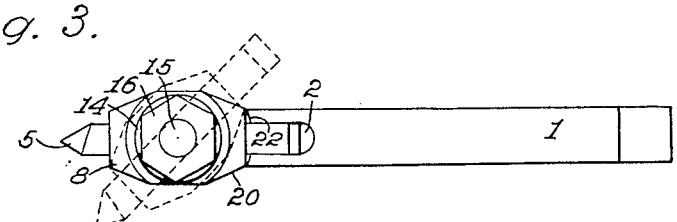
Figure 4:
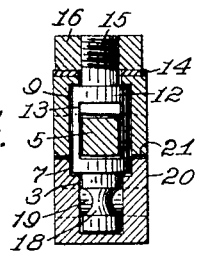

The invention has been illustrated in its preferred embodiment in the accompanying drawing, wherein Figure 1 is a perspective view of the tool holder with a cutter or bit mounted therein; Fig. 2 is a view, partly in elevation and partly in medial vertical longitudinal section, of said tool holder, and Fig. 3 is a top plan view thereof, the dotted lines indicating an adjusted position, horizontally, of the cutter or bit and the clamp therefor. Fig. 4 is a vertical transverse section of said tool holder and tool, taken on the broken line 4—4 of said Fig. 2, and looking in the direction indicated by the arrow.

1 is the tool holder shank of a form suitable to be received and held in the tool post of a lathe or the like, and 20 is a horizontally widened tool holding head integral with said shank. The head 20 preferably has its upper surface depressed below the upper surface of said shank to provide a shoulder 22 and side ledges 21 on each side of a medial longitudinal channel 2 which traverses the upper face of the head and a portion of the shank. A cutter or bit 5 may be removably mounted in the channel 2, and its upper part projects above the ledges 21, its forward or projecting end being under supported by a projection 6 below it and integral with the head 20, but of less width than the tool and sloping downwardly toward the front wall of the head, in order to not interfere with the work.

Said head has a vertically arranged socket 7 which traverses the channel 2, and has a bottom diminished part 3.

8 is a clamping member having a channel 11 along its lower face registering with the channel 2 and receiving the upper part of the bit 5. The member 8 is also vertically centrally orificed at 9—10 reversely to but similar to the shape of the socket 7—3 and in alined registration with the latter.

The numeral 12 denotes a cylindrical body mounted within and fitting the registering openings 9 and 7, and has axially diminished terminals 15 and 17 received within and fitting the diminished openings extending therefrom, the terminal 15 being long enough to project above the clamping member 8 to receive a washer 14, and is threaded to also receive a nut 16. The body 12 has a rectangular medial transverse slot 13 of the same width as and in registration with the registrating channel parts 2—11 to also receive the bit 5, but this slot 13 is higher than the received bit, for a purpose to be presently disclosed.

The lower terminal 17 of said body 12 has an annular groove 18. The head 20 has a transverse orifice 4 to receive a removable pin 19, the latter entering the groove 18 to fasten the body 12 in place.

A cutter or bit 5 may be mounted in the channel 2, and is adjustable longitudinally therein, and secured in the adjusted position by the clamping member 8 under compression of the nut 16. In the event that it is desired to change the position of the bit 5 horizontally angularly to the direction of the shank 1, the nut 16 is moved upwardly so that the clamping member 8 may be lifted sufficiently to clear the ledges 21, and the bit is lifted with the clamping member and swung horizontally therewith to the desired angle to ride upon the ledges 21, and the nut 16 tightened to thus secure the bit in place, as indicated by the dotted lines in said Fig. 3. This adjustment is possible, because the cylindrical body 12 may rock in its seat, the annular groove 18 retaining engagement with the securing pin 19 notwithstanding. The slot 13 in the body 12, being higher vertically than the height of the bit 5, permits the latter to rise therein in the effecting of said adjustment.

It will be observed that, as is shown in said Fig. 1, the tool holder has no protuberances or parts which may interfere with the work, and the clamping means employed is such as to most efficiently secure the tool in an adjusting working position, with a minimum of effort. The parts of the device are of simple forms, requiring little machining, and therefore do not suffer from hard usage, remain always true, and are inexpensive.

Having described my invention, what I claim as new, and desire to secure by Letters Patent, is:

1. A tool holder, embodying a shank with a transversely widened and shouldered head, having an upper channel to receive the lower part of a bit and having a narrower projection whose upper surface coincides with the alined lower face of the bottom of said channel, said member having a vertically arranged socket traversing said channel, and adjustable clamping means, comprising a transversely slotted body seated in said socket rotatably to project above said member and having its slot in line with said channel and of greater vertical height than the latter, means for removably securing said body in said socket while permitting it to be rocked therein, and a clamp adjustably mounted and secured to said body to clamp said bit to said member and upon the top of said projection.

2. A tool holder, embodying a transversely shouldered member having an upper channel to receive the lower part of a bit therein, said member having a vertically arranged bottom socket traversing said channel, and adjustable clamping means, comprising a transversely slotted body seated in said socket rockingly to project above said member and having its slot in line with said channel of greater height than the latter, said body having an annular groove positioned within said socket, said member having a transverse orifice traversing part of said groove, and a pin mounted in said orifice engaging the walls of said groove, permitting the body to be rocked in said socket while secured therein, and a clamp with corners truncated adjustably mounted and secured removably to said body to clamp said bit in an adjusted position upon said member.

Signed at Waterloo, Iowa, this 17th day of March, 1920.

WALTER O. WILLE.